US009389423B2

(12) United States Patent
Bhardwaj et al.

(10) Patent No.: US 9,389,423 B2
(45) Date of Patent: Jul. 12, 2016

(54) HEAD WEARABLE DISPLAY WITH ADJUSTABLE TRANSPARENCY

(71) Applicant: Google Inc., Mountain View, CA (US)

(72) Inventors: Ramesh C. Bhardwaj, Fremont, CA (US); Taisup Hwang, Santa Clara, CA (US); Anurag Gupta, San Jose, CA (US); Simon R. Prakash, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 65 days.

(21) Appl. No.: 14/204,993

(22) Filed: Mar. 11, 2014

(65) Prior Publication Data

US 2015/0260991 A1    Sep. 17, 2015

(51) Int. Cl.
*G02B 27/01*    (2006.01)
*G09G 5/00*    (2006.01)

(52) U.S. Cl.
CPC .......... *G02B 27/0172* (2013.01); *G02B 27/017* (2013.01); *G02B 2027/014* (2013.01); *G02B 2027/0143* (2013.01)

(58) Field of Classification Search
CPC ................... G02B 2027/0178; G02B 27/0172; G02B 27/017; G02B 27/0101; G02B 27/01; G02C 7/101; G02C 7/102
See application file for complete search history.

(56) References Cited

U.S. PATENT DOCUMENTS

| 5,552,841 | A | * | 9/1996 | Gallorini et al. ................. 351/49 |
| 6,762,801 | B2 |  | 7/2004 | Weiss et al. |
| 6,829,095 | B2 |  | 12/2004 | Amitai |
| 2008/0151175 | A1 | * | 6/2008 | Gross ............................... 351/45 |
| 2008/0239452 | A1 | * | 10/2008 | Xu et al. ......................... 359/265 |
| 2009/0059159 | A1 | * | 3/2009 | Howell et al. ................... 351/41 |
| 2013/0113973 | A1 |  | 5/2013 | Miao |
| 2013/0147859 | A1 |  | 6/2013 | Kobayashi |
| 2013/0235286 | A1 | * | 9/2013 | Hung ............................... 349/14 |
| 2013/0314303 | A1 |  | 11/2013 | Osterhout et al. |
| 2014/0111864 | A1 | * | 4/2014 | Margulis et al. .............. 359/630 |

OTHER PUBLICATIONS

Demiryont, H. et al., "Solid-State Monolithic Electrochromic Switchable Visors and Spectacles," Proc. of SPIE vol. 7326, Head- and Helmet-Mounted Displays XIV: Design and Applications, 73260K, May 2009, doi: 10.1117/12.818730, 8 pages.

* cited by examiner

*Primary Examiner* — Lixi C Simpson
(74) *Attorney, Agent, or Firm* — Blakely Sokoloff Taylor & Zafman LLP (57) ABSTRACT

An apparatus for providing adjustable transparency to an optical element of a head wearable display includes an electro-chromic film disposed across the optical element to adjust a transparency of the optical element to ambient light and a transparency controller coupled to control the electro-chromic film with a drive signal to decrease the transparency of the optical element as the brightness of the ambient light increases. The transparency controller includes a scaling circuit coupled to receive a power signal from a power source and coupled to output the driving signal to the electro-chromic film to control the transparency of the optical element. The scaling circuit scales the power signal to generate the driving signal. The transparency controller further includes a control circuit coupled to the scaling circuit to control the scaling applied by the scaling circuit.

15 Claims, 8 Drawing Sheets

HEAD WEARABLE DISPLAY WITH ADJUSTABLE TRANSPARENCY

TECHNICAL FIELD

This disclosure relates generally to the field of optics, and in particular but not exclusively, relates to eyepeices for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method of operation for a head wearable display including an eyepiece having adjustable transparency are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
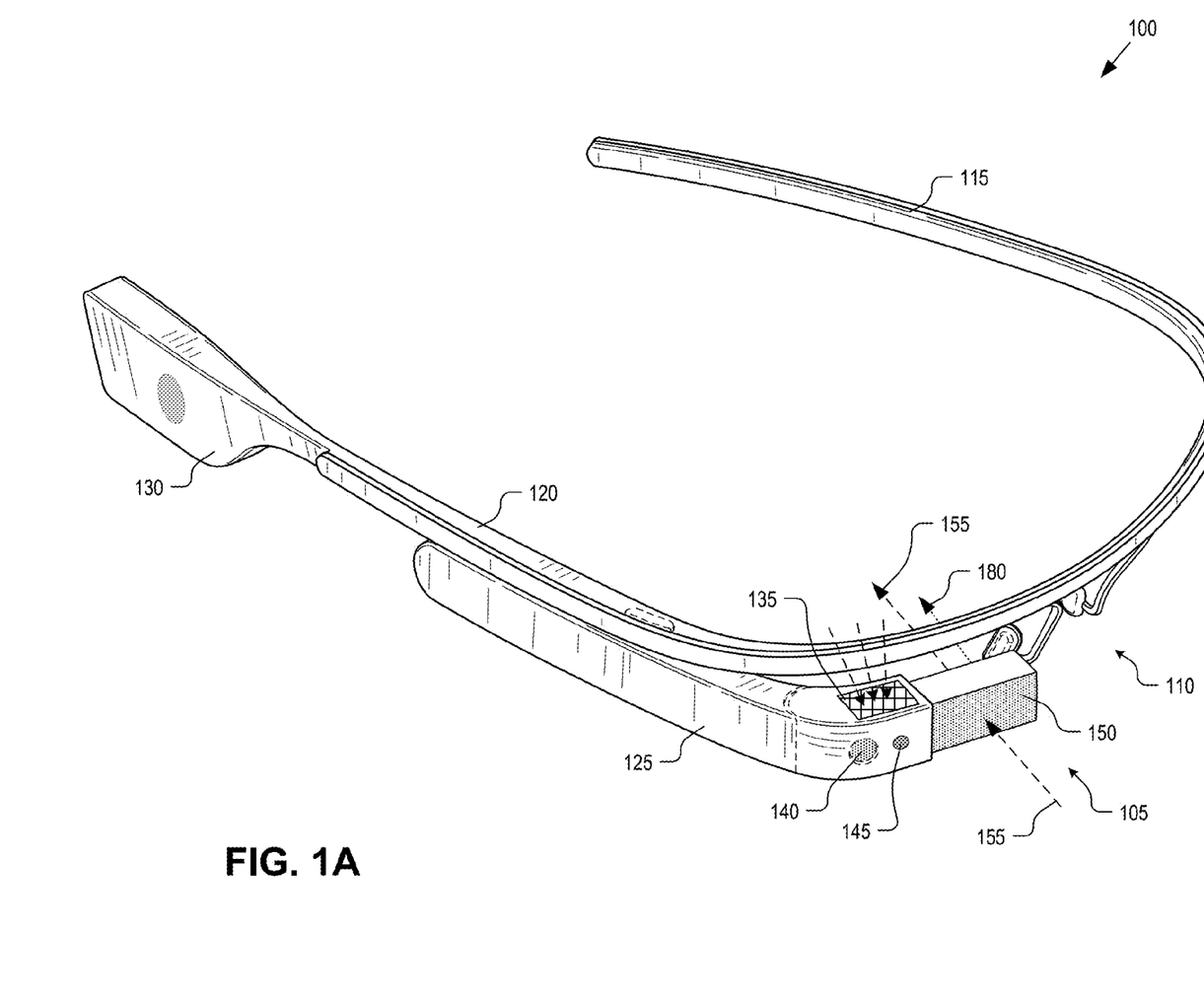
FIGS. 1A and 1B illustrate different views of a head wearable display including an eyepiece having adjustable transparency, in accordance with an embodiment of the disclosure.
Figure 1B:
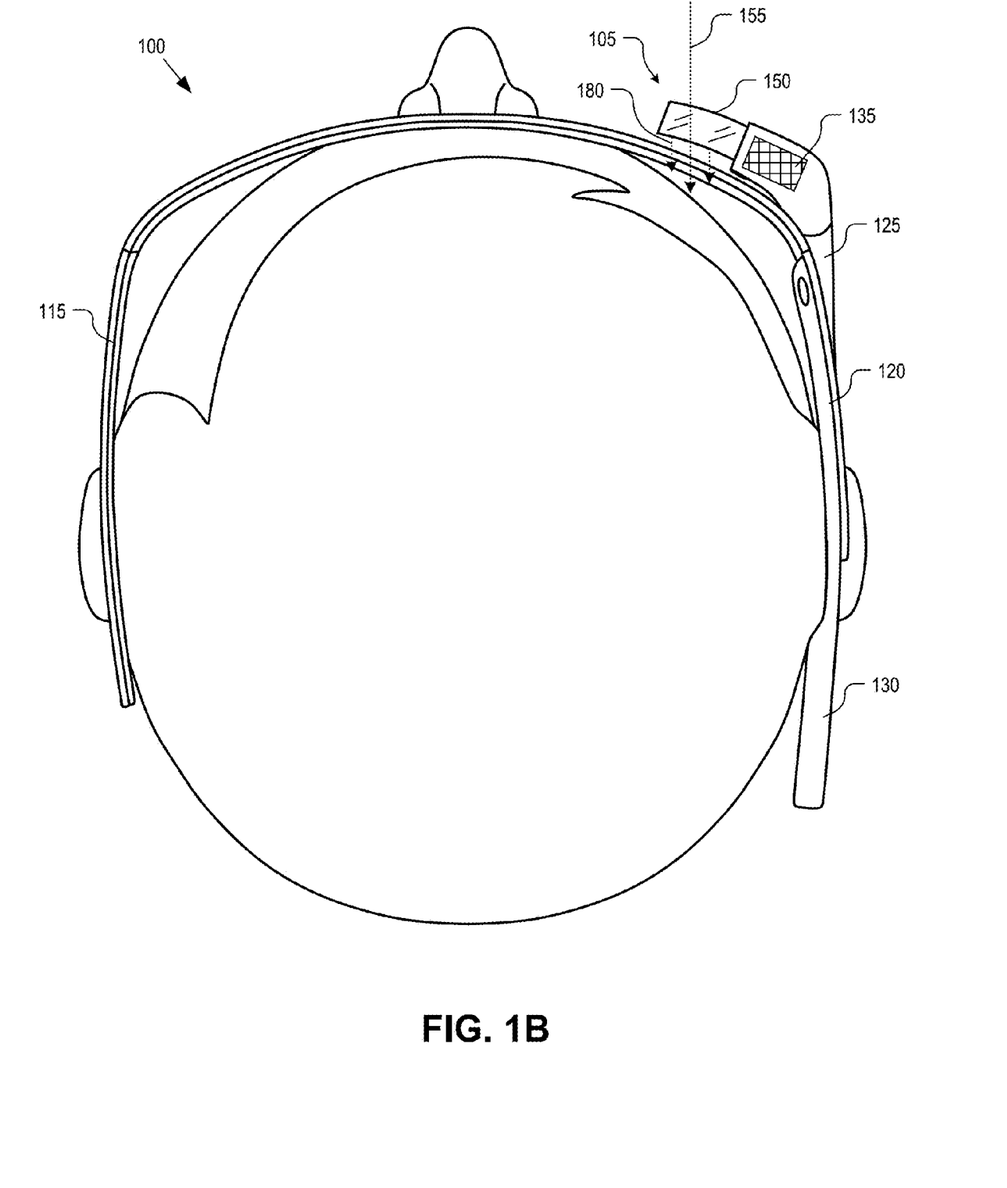

FIGS. 1A and 1B illustrate different views of a head wearable display 100 including an eyepiece 105 having adjustable transparency, in accordance with an embodiment of the disclosure. FIG. 1A is a perspective view of head wearable display 100 while FIG. 1B is a plan view. The illustrated embodiment of head wearable display 100 includes eyepiece 105 mounted to a frame assembly, which includes a nose bridge 110, left ear arm 115, and right ear arm 120. Housings 125 and 130 may contain various electronics including a micro-display, a microprocessor, interfaces, one or more wireless transceivers, one or more power supplies (e.g., battery), a camera, a speaker, etc. In particular, the illustrated embodiment of housing 125 includes a solar cell 135, a forward facing camera 140, and an ambient light sensor 145. In one embodiment, housing 125 houses an electro-chromic dimming system that controls an electro-chromic film 150 disposed across eyepiece 105 for adjusting the transparency of eyepiece 105 to ambient light 155. In one embodiment, a lens cover of camera 140 is coated with an electro-chromic film to provide adjustable transparency to camera 140. Although FIGS. 1A and 1B illustrate a monocular embodiment, head wearable display 100 may also be implemented as a binocular display with two eyepieces 105 each aligned with a respective eye of the user when display 100 is worn.

Eyepiece 105 is a see-through eyepiece that is secured into an eye glass arrangement or head wearable display that can be worn on the head of a user. The left and right ear arms 115 and 120 rest over the user's ears while nose bridge 110 rests over the user's nose. The frame assembly is shaped and sized to position a viewing region of eyepiece 105 in front of (and in some cases slightly above) an eye of the user. Other frame assemblies having other shapes may be used (e.g., traditional eyeglasses frame, a single contiguous headset member, a headband, goggles type eyewear, etc.).

The illustrated embodiment of head wearable display 100 is capable of displaying an augmented reality to the user. Eyepiece 105 permits the user to see a real world image via ambient light 155. Eyepiece 105 internally relays display light 180 generated by a micro-display peripherally located within housing 125 to the viewing region in front of the user's eye. The display light is seen by the user as a virtual image superimposed over ambient light 155 as an augmented reality.

Electro-chromic film 150 is operated to selectively dim, in real-time, ambient light 155 when the ambient environment is sufficiently bright. In the illustrated embodiment, electro-chromic film 150 is coated over the ambient facing side of eyepiece 150. Accordingly, when electro-chromic film 150 is darkened to reduce the transparency of eyepiece 105, the transparency of eyepiece 105 is reduced for ambient light 155 but does not affect the transparency of eyepiece 105 for display light 180 that is relayed within eyepiece 105 from a peripherally located micro-display and emitted in the viewing region out an eye-ward facing side. In bright environments, reducing the transparency of eyepiece 105 to ambient light 155 serves to increase the contrast for display light 180, thereby improving the user's experience. In other embodiments (not illustrated), electro-chromic film 150 may also be coated over the top side, bottom side, and/or distal ends of eyepiece 105.

Conventional eyewear includes the use of photochromic films on lenses to darken a bright environment. Photochromic darkening is entirely passive and consumes now additional power. However, photochromic films do not provide sufficient darkening in bright environments, such as outside on a sunny day. Furthermore, there is no ability to intelligently control or modulate the amount of darkening beyond a passive response to ultraviolet light. In the indoor context, even though indoor lighting may be bright, photochromic darkening will not occur due to the absence of ultraviolet wavelengths in indoor lighting.

Embodiments of head wearable display 100 provide intelligent darkening of electro-chromic film 150 either actively or passively based upon the brightness of the ambient environment. In one embodiment, passive dimming is achieved using solar cell 135 to both power electro-chromic film 150 and control the amount of darkening. In other embodiments, active dimming is achieved using either solar cell 135 and/or ambient light sensor 145. In the active dimming embodiments, electro-chromic film 150 may be powered via solar cell 135 or a battery. Although ambient light sensor 145 is illustrated as an independent hardware element to camera 140, in some embodiments, camera 140 may be operated to both capture forward facing images and used to implement an ambient light sensor functionality. For example, if camera 145 includes auto-exposure circuitry, feedback from the auto-exposure circuitry could also serve as a brightness meter or ambient light sensor.

Electro-chromic darkening of eyepiece 105 may be triggered based upon general ambient brightness. However, ambient light 155 incident upon eyepiece 105 within the user's field of view ("FOV") or forward vision is the most relevant light for determining whether eyepiece 105 should be darkened. Accordingly, in some embodiments, optical elements may be positioned over ambient light sensor 145 and/or solar cell 135 to constrain the light incident upon these elements to rays originating from the user's FOV.

Figure 2A:
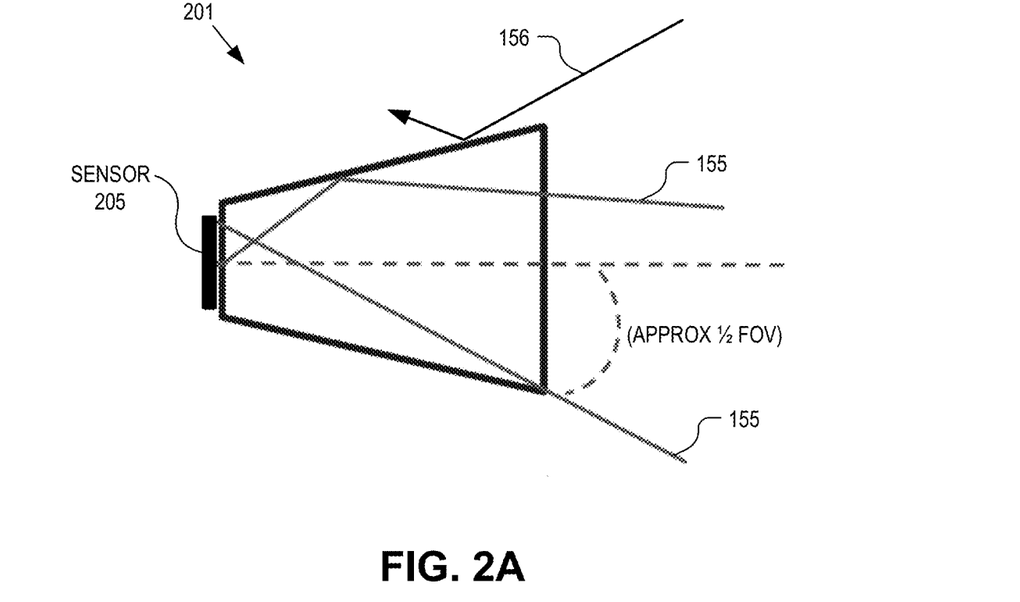
FIGS. 2A and 2B illustrate demonstrative light concentrators for concentrating ambient light from the user's field of view, in accordance with an embodiment of the disclosure.
Figure 2B:
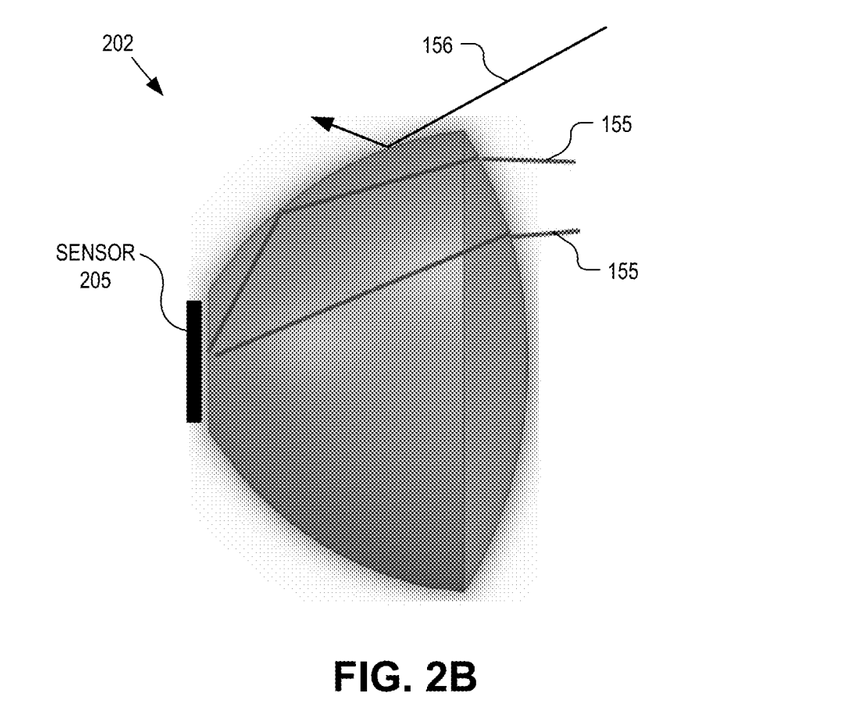

FIGS. 2A and 2B illustrate demonstrative light concentrators for concentrating or confining ambient light to the user's FOV, in accordance with an embodiment of the disclosure. FIG. 2A illustrates a concentrator 201 having a flat baffle design with reflective interior sides. Concentrator 201 is positioned to collect ambient light 155 and direct ambient light 155 onto sensor 205. Sensor 205 may be implemented as either solar cell 135 or ambient light sensor 145. In one embodiment, concentrator 201 is mounted and aligned to direct ambient light originating within the user's FOV (e.g., approximately 16 degrees) onto sensor 205, but reject ambient light 156 incident outside of the user's FOV. FIG. 2B illustrates a concentrator 202 having reflective interior sides with curvature. Concentrator 202 may be operated and mounted in a similar manner as concentrator 201 to direct light incident from the FOV of the user's gazing direction onto sensor 205.

Figure 3:
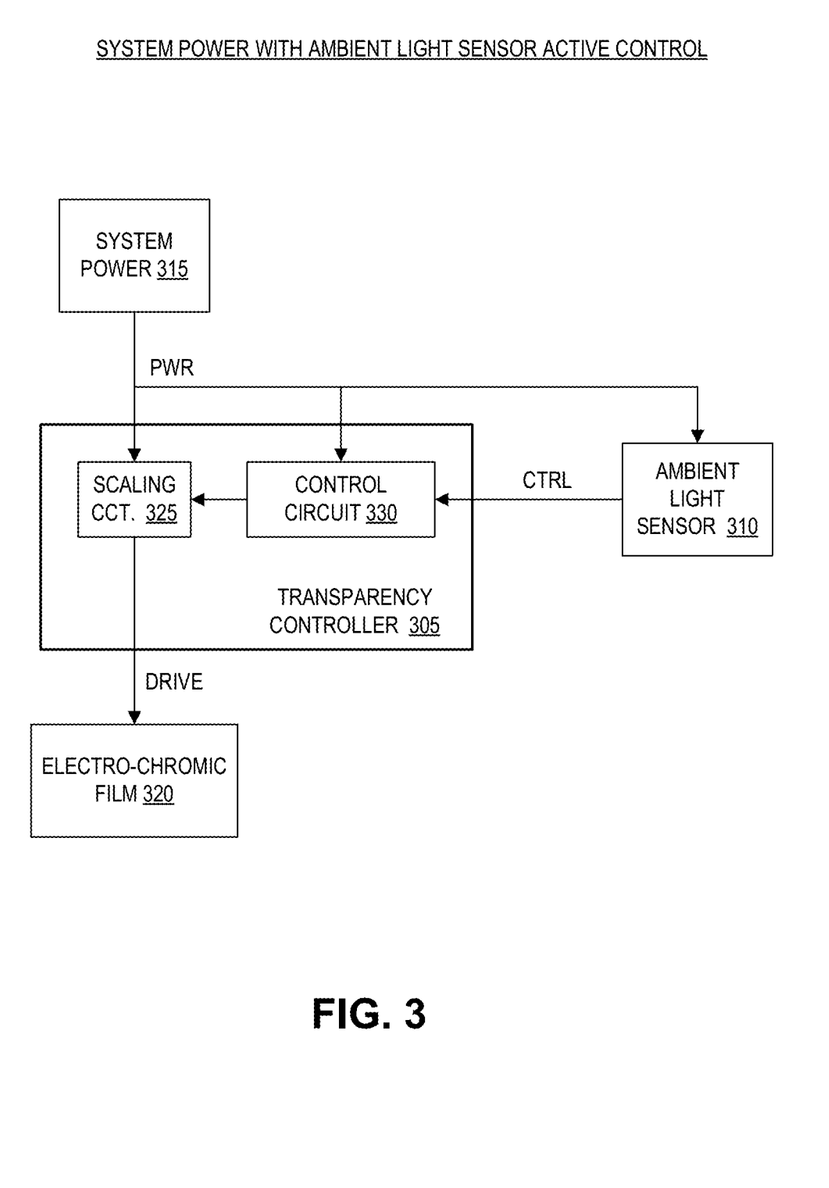
FIG. 3 is a functional block diagram illustrating an electro-chromic dimming system with active control based on an ambient light sensor, in accordance with an embodiment of the disclosure.

FIG. 3 is a functional block diagram illustrating an electro-chromic dimming system 300 with active control based on an ambient light sensor, in accordance with an embodiment of the disclosure. The illustrated embodiment of electro-chromic dimming system 300 includes a transparency controller 305, an ambient light sensor 310, system power 315, and electro-chromic film 320. The illustrated embodiment of transparency controller 305 includes a scaling circuit 325 and a control circuit 330.

Electro-chromic dimming system 300 is one possible system that may be included within head wearable display 100 to provide adjustable transparency to eyepiece 105. In one embodiment, system power 315 may be implemented as a battery disposed within housing 125 or 130, ambient light sensor 310 may correspond to ambient light sensor 145, electro-chromic film 320 may correspond to electro-chromic film 150, and transparency controller 305 may be disposed with housing 125 or 130.

Transparency controller 305 provides active control over the transparency of eyepiece 105 based upon a control signal (CTRL) received from ambient light sensor 310. Based upon the control signal, transparency controller 305 modulates the darkening of electro-chromic film 320 with a drive signal (DRIVE). In one embodiment, the drive signal is a voltage signal applied across electro-chromic film 320. Electro-chromic film 320 may be implemented as a multi-layer film including an anode layer and a cathode layer (e.g., lithium nickel) separated by an electrolyte material. Transparency dimming of electro-chromic film 320 is achieved by the application of a voltage (i.e., the drive signal) across the anode and cathode layers. Power for the drive signal is drawn from the power signal (PWR) output from system power 315 and scaled by scaling circuit 325 under the influence of control circuit 330. Scaling circuit 325 may provide a linear scaling, non-linear scaling, or adaptive/intelligent scaling based upon various ambient lighting conditions. Scaling circuit 325 may be implemented as a variable voltage divider, a voltage controlled resistor, a controllable voltage regulator, a potentiometer, or otherwise.

Figure 4:
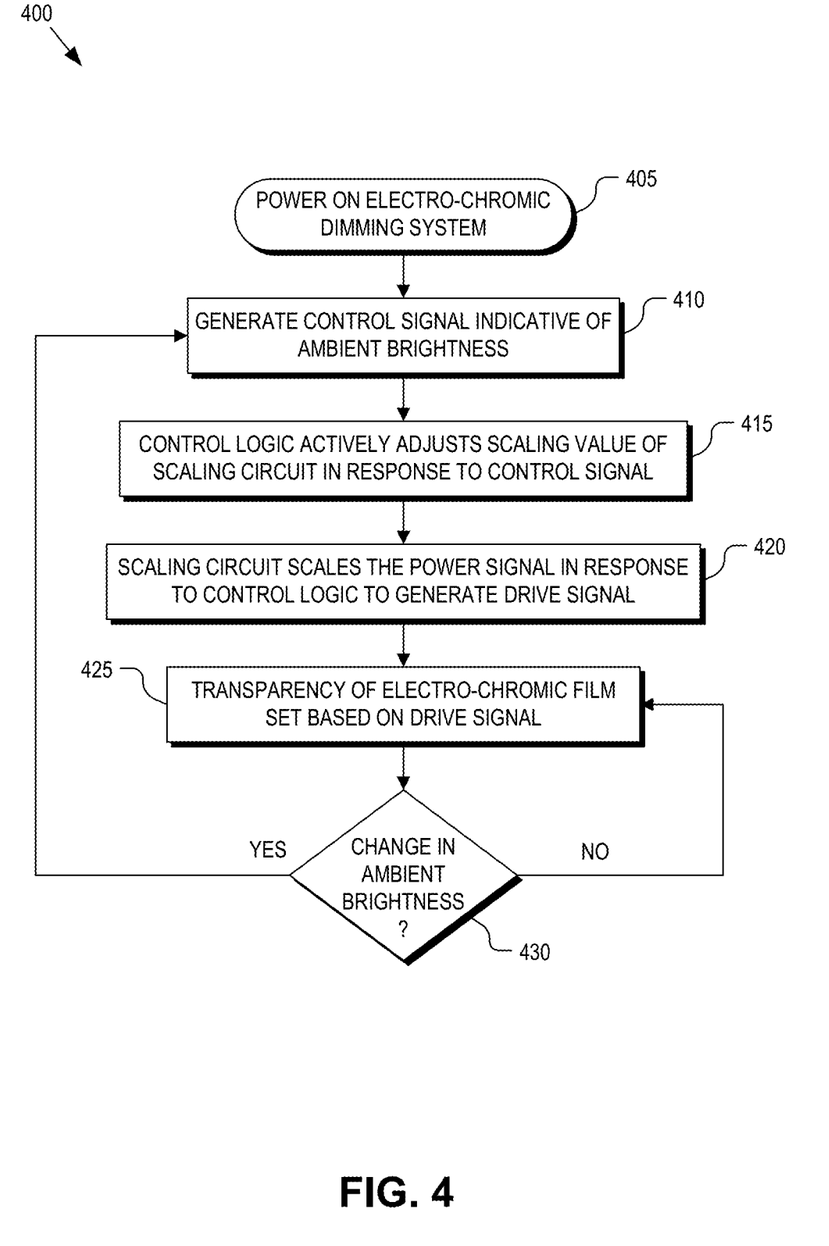
FIG. 4 is a flow chart illustrating a process for operation an electro-chromic dimming system with active control based on an ambient light sensor, in accordance with an embodiment of the disclosure.

FIG. 4 is a flow chart illustrating a process 400 for operation of electro-chromic dimming system 300, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process 405, electro-chromic dimming system 400 is powered on. Powering on the system may include coupling system power 315 to transparency controller 330 and ambient light sensor 310. Once powered on, ambient light sensor 310 generates the control signal (CTRL), which is indicative of the intensity or brightness of the ambient light striking it surface (process block 410). As previously mentioned, a concentrator optical element may be aligned with ambient light sensor 310 to confine the ambient light to light incident within the user's FOV. Accordingly, the control signal is a real-time signal indicative of the ambient brightness incident upon the user's eye and eyepiece 105.

In a process block 415, control circuitry 330 evaluates the control signal and adjusts the scaling value applied by scaling circuit 325 according to the control signal. In one embodiment, control circuit 330 may be implemented as a lookup table that indexes value ranges for the control signal to scaling values for manipulating scaling circuit 325. Alternatively, control circuit 330 may be a digital or analog circuit that implements a control formula that translates the control signal into a scaling value for adjusting scaling circuit 325. For example, in an embodiment where scaling circuit 325 is implemented as a voltage divider with a voltage controlled resistor, the scaling value may be a voltage for manipulating the voltage controlled resistor. Of course, other more energy efficient circuits that include reactive or active elements may be used to implement scaling circuit 325.

In a process block 420, scaling circuit 325 scales the power signal received from system power 315 to generate the drive signal. As mentioned above, the drive signal may be a voltage signal that controls and powers electro-chromic film 320. The drive signal then sets the transparency of electro-chromic film 320 and by extension the transparency of eyepiece 105. Process 400 operates as a continuous loop that updates the transparency of eyepiece 105 in real-time by returning to process block 410 when the brightness of the ambient environment changes, as sensed by ambient light sensor 310.

Figure 5:
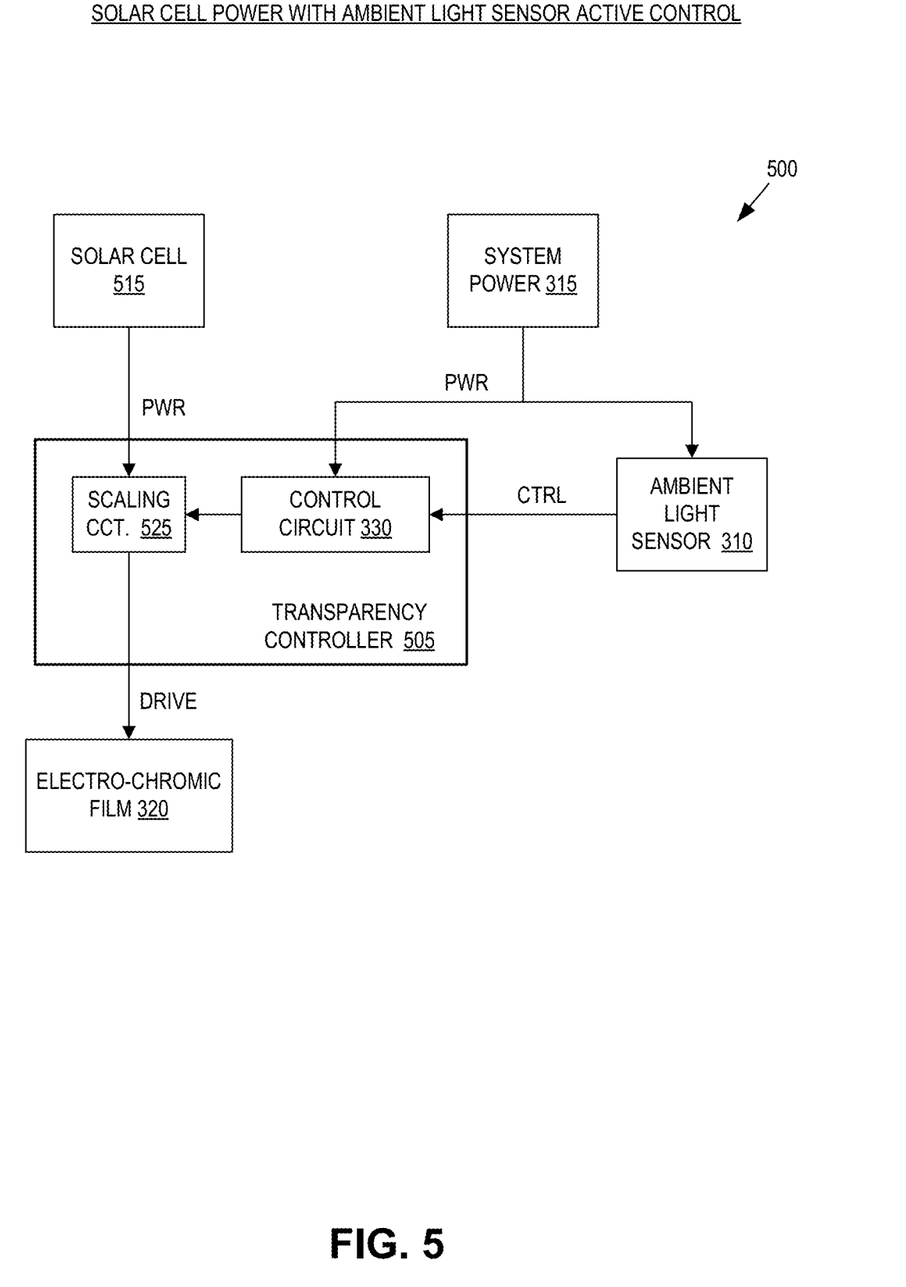
FIG. 5 is a functional block diagram illustrating an electro-chromic dimming system including a solar cell for power and active control based on an ambient light sensor, in accordance with an embodiment of the disclosure.

FIG. 5 is a functional block diagram illustrating an electro-chromic dimming system 500 including a solar cell for power and active control based on an ambient light sensor, in accordance with an embodiment of the disclosure. Electro-chromic dimming system 500 is similar to electro-chromic dimming system 300, except that a solar cell 515 (corresponding to solar cell 135 in FIGS. 1A & 1B) is used to power electro-chromic film 320 via scaling circuit 525 within transparency controller 505. Accordingly, control circuit 330 and ambient light sensor 310 operate in a similar manner as described in connection with electro-chromic dimming system 300 in process 400. However, the power signal that is scaled by scaling circuit 525 to drive electro-chromic film 320 is solar powered. In one embodiment, scaling circuit 525 and/or control circuit 300 includes thresholding logic that disables transparency control until sufficient solar generated power is available from solar cell 505 to generate the drive signal and power operation of electro-chromic film 320.

Figure 6:
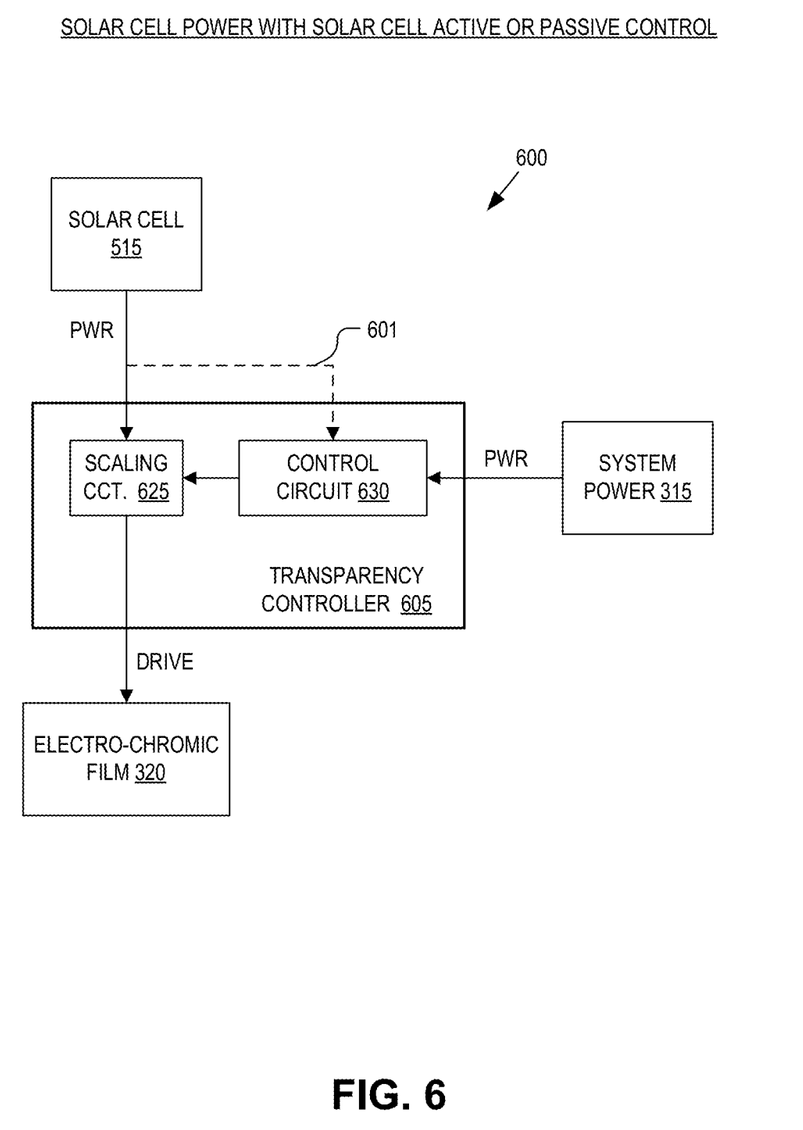
FIG. 6 is a functional block diagram illustrating an electro-chromic dimming system with active or passive control based upon a solar cell, in accordance with an embodiment of the disclosure.

FIG. 6 is a functional block diagram illustrating an electro-chromic dimming system 600 with active or passive control based upon a solar cell, in accordance with an embodiment of the disclosure. The illustrated embodiment of electro-chromic dimming system 600 includes a transparency controller 605, system power 315, solar cell 515, and electro-chromic film 320. The illustrated embodiment of transparency controller 605 includes a scaling circuit 625 and control circuit 630.

In a passive embodiment, solar cell 515 is coupled to power electro-chromic film 320 via scaling circuit 625. The drive signal is generated as a scaled value of the power signal output from solar cell 515; however, scaling circuit 625 operates to merely bias or offset the drive signal relative to the power signal output from solar cell 515. Thus, as brightness of the ambient light 155 incident upon solar cell 515 increases, solar cell 515 is capable of providing more power for increased darkening of electro-chromic film 320. Electro-chromic dimming system 600 can be configured to be passive, since control circuit 630 can operate to provide a manual calibration adjustment to determine appropriate bias or offset of the drive signal; however, during operation it is the variable output power from solar cell 515 that controls the amount of dimming applied to electro-chromic film 320.

Alternatively, solar cell 515 can be coupled to also provide the power signal generated by solar cell 515 to control circuit 630 (illustrated as optional by dashed line 601). The power signal output from solar cell 515 need not power control circuit 630, rather in the illustrated embodiment control circuit 630 is powered by system power 315. Coupling solar cell 515 to control circuit 630 enables control circuit 630 to monitor the voltage output by solar cell 515 and provide additional active feedback control to scaling circuit 625 in addition to the inherent passive control already present in the system. For example, control circuit 630 can add intelligent control that disables scaling circuit 625 at certain defined thresholds, can introduce hysteresis into changes in the drive signal, facilitate non-linear adjustments, etc.

Figure 7:
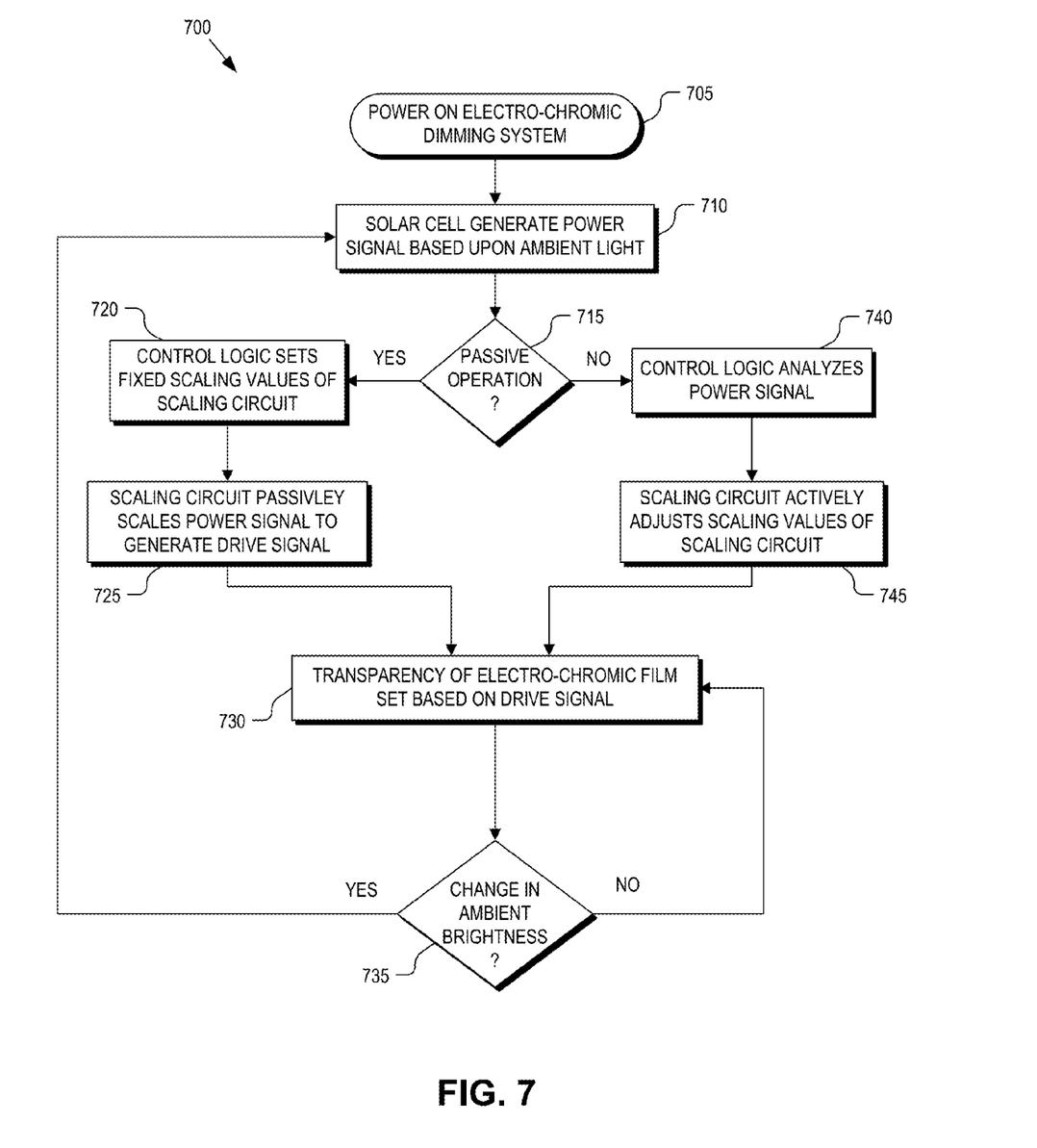
FIG. 7 is a flow chart illustrating a process for operation an electro-chromic dimming system with active or passive control based upon a solar cell, in accordance with an embodiment of the disclosure.

FIG. 7 is a flow chart illustrating a process 700 for operation of electro-chromic dimming system 600 with active or passive control based upon solar cell 515, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In a process block 705, electro-chromic dimming system 600 is powered on or enabled. Once enabled, solar cell 515 commences generating a power signal in response to incident ambient light (process block 710). If electro-chromic dimming system 600 is implemented with passive dimming (decision block 715), then control circuit 630 operates to set a fixed scaling value (e.g., biasing or offset value). This fixed scaling value may be a configuration value that is set just once as part of an initial calibration, set periodically, or set in response to user input. With the scaling value determined, scaling circuit 625 operates to passively scale the power signal output from solar cell 515 to generate the drive signal (process 725). The drive signal is coupled to electro-chromic film 320 to adjust it transparency, and by extension the transparency of the eyepiece (process block 730). Passive scaling of the power signal means that if the voltage of the power signal rises, then the voltage of the drive signal also rises by a corresponding amount determined by the fixed scaling value. Correspondingly, if the voltage of the power signal falls, then the voltage of the drive signal also falls by a corresponding amount determined by the fixed scaling value. Accordingly, changes in the intensity or brightness of the ambient light incident upon solar cell 515 directly and passively control adjustments in the drive signal without active management by control circuit 630 (decision block 735).

Returning to decision block 715, if electro-chromic dimming system 600 is implemented with active dimming, then control circuit 630 operates to actively manage the scaling value (e.g., biasing or offset value) applied by scaling circuit 625. In a process block 740, control circuit 630 is also coupled to receive the power signal output from solar cell 515. However, control circuit 630 receives its operational power from system power 315, but is coupled to analyze or monitor the power signal received from solar cell 515. Based upon the level of the power signal output from solar cell 515, control circuit 630 actively adjusts the scaling value applied by scaling circuit 625 (process block 745). For example, control circuit 630 may actively adjust the scaling value (e.g., offset or bias) to provide a non-linear response or relationship between the power signal output from solar cell 515 and the drive signal that powers and controls the transparency of electro-chromic film 320. Control circuit 630 may also introduce hysteresis, a dimming delay, or other active control functionality. After process block 745, process 700 continues from process block 730 as described above.

Although the above embodiments has discussed various systems for electro-chromic darkening of eyepiece 105, it should be appreciated that electro-chromic dimming systems 300, 500, or 600 may also be used to provide a variable transparency optic in front of camera 140. In other words, electro-chromic film 320 may also be coated on an optical element that cover a lens of camera 140 to provide adjustable dimming in bright environments for the camera module.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC"), analog circuitry, or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for providing adjustable transparency to an optical element of a head wearable display, the apparatus comprising:
    an electro-chromic film disposed across the optical element of the head wearable display to adjust a transparency of the optical element to ambient light;
    a transparency controller coupled to control the electro-chromic film with a drive signal to decrease the transparency of the optical element as the brightness of the ambient light increases, the transparency controller including:
        a scaling circuit coupled to receive a power signal from a power source and coupled to output the driving signal to the electro-chromic film to control the transparency of the optical element, wherein the scaling circuit scales the power signal to generate the driving signal, wherein the power source comprises a solar cell disposed on a surface of the head wearable display and wherein the solar cell is coupled to convert the ambient light to the power signal for powering the electro-chromic film through the scaling circuit, wherein the solar cell is coupled to passively scale the drive signal through the scaling circuit such that a voltage of the drive signal passively increases when the power signal output from the solar cell increases due to increased brightness of the ambient light incident upon the solar cell; and
    a control circuit coupled to the scaling circuit to control the scaling applied by the scaling circuit, wherein the control circuit is coupled to the solar cell to monitor the power signal and coupled to the scaling circuit to actively manage a scaling value of the scaling circuit based upon the power signal.

2. The apparatus of claim 1, wherein the scaling circuit is coupled to passively adjust the driving signal in response to changes in the power signal such that the transparency of the optical element decreases as the brightness of the ambient light increases.

3. The apparatus of claim 1, further comprising:
    a light concentrator optically aligned with the solar cell to concentrate the ambient light within a field of view of the user onto the solar cell while blocking the ambient light outside of the field of view of the user from reaching the solar cell so that the transparency of the optical element is based upon the brightness of the ambient light within the field of view of the user.

4. The apparatus of claim 1, wherein the control circuit is powered by a system power source separate from the solar cell.

5. The apparatus of claim 1, further comprising:
    an ambient light sensor disposed within the head wearable display and oriented to monitor the brightness of the ambient light incident within a field of view of a user of the head wearable display and to generate a control signal indicative of the brightness of the ambient light incident within the field of view of the user,
    wherein the control circuit is coupled to receive the control signal from the ambient light sensor and to actively adjust the scaling applied by the scaling circuit based upon changes in the control signal.

6. The apparatus of claim 5, further comprising:
    a light concentrator optically aligned with the ambient light sensor to concentrate the ambient light within the field of view of the user onto the ambient light sensor while blocking the ambient light outside of the field of view of the user from reaching the ambient light sensor so that the scaling applied by the scaling circuit is based upon the brightness of the ambient light within the field of view of the user.

7. The apparatus of claim 5, wherein the control circuit is powered by a system power source separate from the solar cell.

8. The apparatus of claim 1, wherein the optical element of the head wearable display comprises an eyepiece that passes the ambient light received at an ambient facing side through to an eye-ward facing side and relays computer generated image ("CGI") light from a peripheral display to a viewing region for emission out the eye-ward facing side superimposed on the ambient light passed through the eye-ward facing side.

9. The apparatus of claim 1, wherein the optical element covers a lens of a camera module disposed with the head wearable display.

10. The apparatus of claim 1, wherein the electro-chromic film comprises a voltage controlled liquid crystal coating.

11. A head wearable display comprising:
    an eyepiece that passes ambient light received at an ambient facing side through to an eye-ward facing side and relays display light from a peripherally located display to a viewing region for emission out the eye-ward facing side superimposed on the ambient light passed through the eye-ward facing side;
an electro-chromic film disposed across the eyepiece;
a transparency controller coupled to control the electro-chromic film with a drive signal to adjust a transparency of the eyepiece in real-time based upon a brightness of the ambient light, the transparency controller including:
a scaling circuit coupled to receive a power signal from a power source and coupled to output the driving signal to the electro-chromic film to control the transparency of the electro-chromic film, wherein the scaling circuit scales the power signal to generate the driving signal, wherein the power source comprises a solar cell disposed on a surface of the head wearable display and wherein the solar cell is coupled to convert the ambient light to the power signal for powering the electro-chromic film through the scaling circuit, wherein the solar cell is coupled to passively scale the drive signal through the scaling circuit such that a voltage of the drive signal passively increases when the power signal output from the solar cell increases due to increased brightness of the ambient light incident upon the solar cell; and
a control circuit coupled to the scaling circuit to control the scaling applied by the scaling circuit, wherein the control circuit is coupled to the solar cell to monitor the power signal and coupled to the scaling circuit to actively manage a scaling value of the scaling circuit based upon the power signal; and
a frame assembly to support the eyepiece and the transparency controller for wearing on a head of a user with the viewing region positioned in front of an eye of the user.

12. The head wearable display of claim 11, wherein the scaling circuit is coupled to passively adjust the driving signal in response to changes in the power signal such that the transparency of the electro-chromic film decreases as the brightness of the ambient light increases.

13. The head wearable display of claim 11, further comprising:
an ambient light sensor disposed within the head wearable display and oriented to monitor the brightness of the ambient light incident within a field of view of a user of the head wearable display and to generate a control signal indicative of the brightness of the ambient light incident within the field of view of the user,
wherein the control circuit is coupled to receive the control signal from the ambient light sensor and to actively adjust the scaling applied by the scaling circuit based upon changes in the control signal.

14. The head wearable display of claim 13, further comprising:
a light concentrator optically aligned with the ambient light sensor to concentrate the ambient light within the field of view of the user onto the ambient light sensor while blocking the ambient light outside of the field of view of the user from reaching the ambient light sensor so that the scaling applied by the scaling circuit is based upon the brightness of the ambient light within the field of view of the user.

15. The head wearable display of claim 11, wherein the electro-chromic film comprises a voltage controlled liquid crystal coating.

* * * * *